US009704418B2

(12) United States Patent
Chang et al.

(10) Patent No.: US 9,704,418 B2
(45) Date of Patent: Jul. 11, 2017

(54) DEVICE FOR OCULAR SURGERY TRAINING

(71) Applicant: The Catholic University of Korea Industry-Academic Cooperation Foundation, Seoul (KR)

(72) Inventors: Dong Jin Chang, Seoul (KR); Choun-ki Joo, Seoul (KR)

(73) Assignee: The Catholic University of Korea Industry-Academic Cooperation Foundation, Seoul (KR)

( * ) Notice: Subject to any disclaimer, the term of this patent is extended or adjusted under 35 U.S.C. 154(b) by 186 days.

(21) Appl. No.: 14/667,750

(22) Filed: Mar. 25, 2015

(65) Prior Publication Data
US 2015/0279239 A1 Oct. 1, 2015

(30) Foreign Application Priority Data
Mar. 28, 2014 (KR) .................. 10-2014-0036740

(51) Int. Cl.
G09B 23/28 (2006.01)
G09B 23/30 (2006.01)

(52) U.S. Cl.
CPC .................. G09B 23/30 (2013.01)

(58) Field of Classification Search
USPC .................. 434/262, 267, 270, 271, 272
See application file for complete search history.

(56) References Cited

U.S. PATENT DOCUMENTS

| | | | | |
|---|---|---|---|---|
| 4,642,055 A * | 2/1987 | Saliterman | ........... | G09B 23/285 434/268 |
| 5,893,719 A * | 4/1999 | Radow | ........... | G09B 23/28 434/271 |
| 6,485,142 B1 * | 11/2002 | Sheehy | ........... | G09B 23/22 351/203 |
| 6,589,057 B1 * | 7/2003 | Keenan | ........... | G09B 23/30 434/271 |
| 7,896,653 B2 * | 3/2011 | Nylen | ........... | G09B 23/32 434/271 |
| 8,608,481 B2 * | 12/2013 | Simon | ........... | A61B 5/06 434/262 |

(Continued)

FOREIGN PATENT DOCUMENTS

JP 4509216 5/2010
KR 1986-0002258 * 4/1986

(Continued)

OTHER PUBLICATIONS

Korean Patent Office, Office Action issued on Apr. 28, 2015 against the corresponding Korean Patent Application No. 10-2014-0036740 without an English Translation.

*Primary Examiner* — Kurt Fernstrom
(74) *Attorney, Agent, or Firm* — Hammer & Associates, P.C.

(57) ABSTRACT

The present invention relates to an ocular surgery training device, which includes an eye model having a hole at one side, and a catheter inserted into the hole, wherein a pressure sensor for measuring a pressure applied to the hole by the catheter is provided at one end of the catheter. The present invention may provide the ocular surgery training device which may enhance the skill of users in performing ocular surgery, thereby preventing complications.

1 Claim, 3 Drawing Sheets

(56) References Cited

U.S. PATENT DOCUMENTS

| | | | | |
|---|---|---|---|---|
| 8,821,166 B2* | 9/2014 | Akura | ............... | G09B 23/28 |
| | | | | 424/427 |
| 8,845,334 B1* | 9/2014 | Stoll | ............... | G09B 23/28 |
| | | | | 434/262 |
| 2010/0292566 A1* | 11/2010 | Nagano | ............... | A61B 5/6885 |
| | | | | 600/424 |
| 2015/0024364 A1* | 1/2015 | Lee | ............... | G09B 23/30 |
| | | | | 434/271 |
| 2015/0037775 A1* | 2/2015 | Ottensmeyer | ............... | G09B 23/34 |
| | | | | 434/271 |

FOREIGN PATENT DOCUMENTS

| | | |
|---|---|---|
| KR | 2011-0029313 A | 3/2011 |
| KR | 2011-0054584 A | 5/2011 |

* cited by examiner

DEVICE FOR OCULAR SURGERY TRAINING

FIELD OF INVENTION

The present invention relates to a device for ocular surgery training.

BACKGROUND ART

In general, an extremely fine operation is required for intraocular surgery, and several devices for the fine operation have been developed recently, but whether intraocular surgery is successful and the occurrence of complications is decreased substantially depends on the operating skill of users who use the device.

For example, crystalline lens extraction is performed in cataract surgery. A method of suctioning subretinal fluid and closing a retinal tear so as to lead a detached retina back into place; or a method of puncturing a sclera and a choroid, suctioning the subretinal fluid using an injection needle, and adhering the retinal tear by cryotherapy or diathermy; or scleral buckling, which is a method of inserting silicone, polyethylene tubes or the like into the sclera under the detached retina and pushing the choroid to a vitreous body is performed in surgery for retinal detachment.

In these types of intraocular surgery, insertion of a catheter such as the injection needle, an ultrasonic handpiece for phacoemulsification, an ablation probe for the vitreous body, or the like is necessary.

In surgery where the catheter is inserted through a fine incision made in an ocular tissue and operated, when the incision is pushed or pulled, traction of the ocular tissue may be caused, thereby causing complications such as damage to the ocular tissue, consequent bleeding, retinal detachment, etc. Accordingly, a pivot movement of the catheter with the incision as its center is an essential surgical skill. Further, when the inserted catheter is unnecessarily brought into contact with a site irrelevant to a surgical site, damage to an intraocular fine tissue may be caused, complications such as intraocular bleeding, elevated intraocular pressure, suprachoroidal hemorrhage, retinal detachment, retinal tear, or the like may be caused.

Accordingly, patent document 1 discloses an ophthalmological device for the measurement of intraocular fluid pressure as a method of controlling intraocular pressure upon surgery.

However, since any special training method for operating the ophthalmological device was suggested in patent document 1, the problem of the occurrence of complications caused by unskilled operation of the users still remains unsolved.

DISCLOSURE

Patent document 1: Korean Patent Application Laid-Open No. 1986-0002258

TECHNICAL PROBLEM

The objective of the present invention is to provide a device for ocular surgery training, which may reinforce the capability of the users, and thus may prevent complications such as damage to an ocular tissue, consequent bleeding, retinal detachment, or the like attributable to unskilled operation of a catheter inserted inside the eyeball.

TECHNICAL SOLUTION

One aspect of the present invention provides an ocular surgery training device, which includes an eye model having a hole at one side, and a catheter inserted into the hole, wherein a pressure sensor for measuring a pressure applied to the hole by the catheter is provided at one end of the catheter.

ADVANTAGEOUS EFFECTS

As described above, the present invention may provide an ocular surgery training device, which includes an eye model having a hole at one side, and a catheter inserted into the hole, wherein a pressure sensor for measuring a pressure applied to the hole by the catheter is provided at one end of the catheter. Thereby, it is possible to provide the ocular surgery training device which can enhance the skill of the users to perform ocular surgery and thus prevent complications.

MODES OF THE INVENTION

The present invention relates to an ocular surgery training device, which includes an eye model having a hole at one side, and a catheter inserted into the hole, wherein a pressure sensor for measuring a pressure applied to the hole by the catheter is provided at one end of the catheter.

Hereinafter, the ocular surgery training device according to an embodiment of the present invention will be described in detail.

Figure 1:
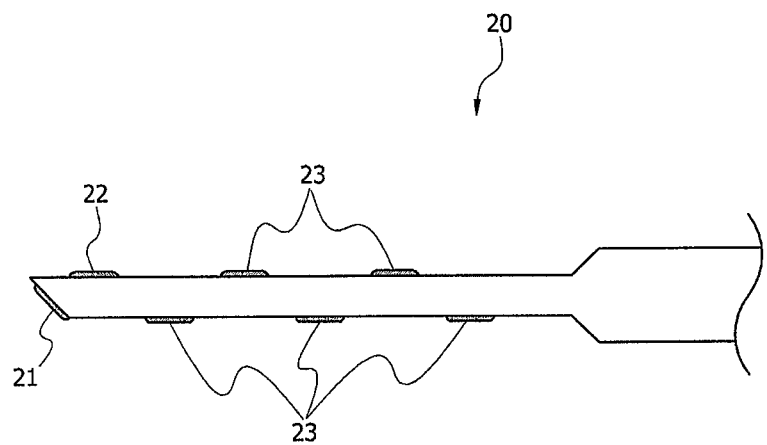
FIG. 1 is a partially-enlarged view of a cross section of a catheter according to an embodiment of the present invention.
Figure 2:
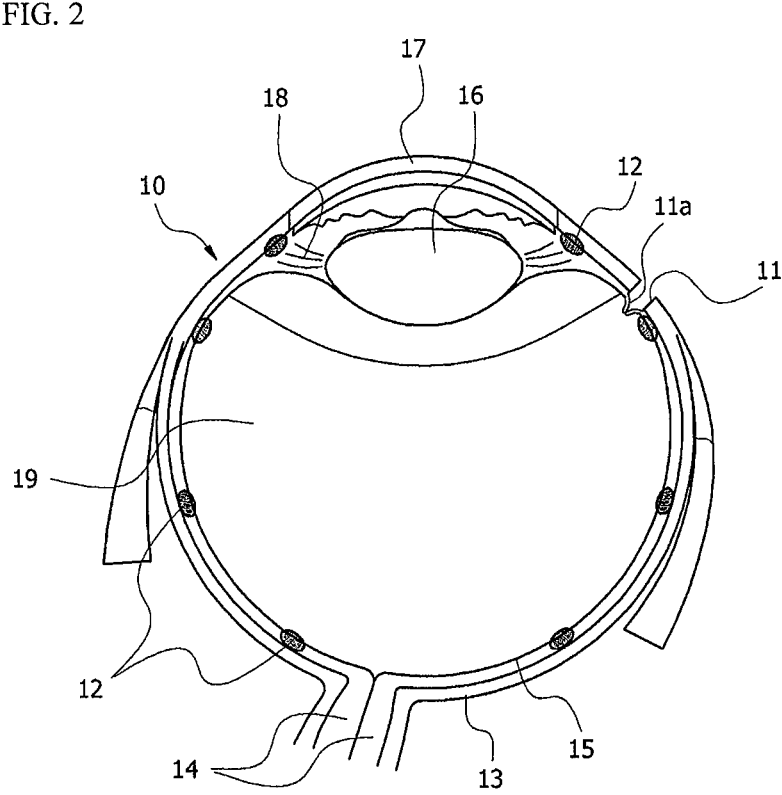
FIG. 2 is a cross sectional view of an eye model according to an embodiment of the present invention.
Figure 3:
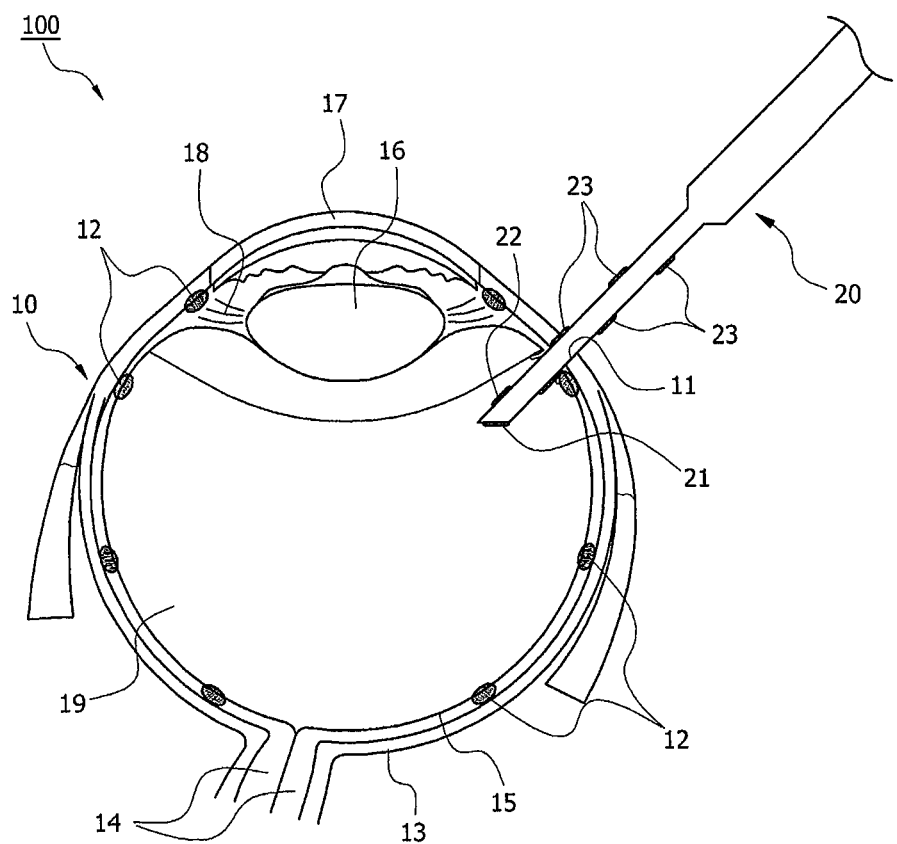
FIG. 3 is a state diagram for use of an ocular surgery training device according to an embodiment of the present invention.

The appended FIG. 1 is a partially enlarged view of a cross section of a catheter according to an embodiment of the present invention, FIG. 2 is a cross sectional view of an eye model according to an embodiment of the present invention, and FIG. 3 is a state diagram for use of an ocular surgery training device according to an embodiment of the present invention.

As shown in FIGS. 1 to 3, the ocular surgery training device 100 according to the embodiment of the present invention is provided with an eye model 10 having a hole 11 at one side thereof, and a catheter 20 inserted into the eye model 10 through the hole 11, and includes a pressure sensor 21 for measuring a pressure applied by the catheter 20 inserted into the eye model 10 at one end of the catheter 20.

Here, the eye model 10 is not particularly limited, and has the same structure as a real eye including a sclera 13, an optic nerve 14, a retina 15, a crystalline lens 16, a cornea 17, an iris and ciliary body 18, a vitreous body 19, or the like. Examples of the materials of the eye model may include silicones, cellophanes, solid proteins, collagens, etc.

Further, the material of the vitreous body may be in a gel form in which polymer chains are chemically crosslinked or physically crossed to form a network, and preferably, examples of the materials may include one or more types selected from the group consisting of silicone gel, cross-linked polyvinyl alcohol, cross-linked poly(1-vinyl-2-pyrrolidinone, and hyaluronic acid sodium salt. Accordingly, one who trains for surgery, in other words, a user, may be satisfied with the texture and density of the eye model similar to those of the real eye, and thereby the effect of the surgical training may be optimized.

According to the embodiment of the present invention, the hole 11 formed at one side of the eye model 10 may be formed at one side of the cornea 17 or the sclera 13 of the eye model, and preferably, may be formed at a sclera 13 for cataract surgical training.

Further, any tubular catheter which may be utilized in ocular surgery may be used as the catheter 20 without limitation.

The hole 11 has a size into which the catheter 20 can be inserted, a position of the hole 11 is also not particularly limited, and the hole 11 may have any structure in which an outflow of inner filling materials to the outside may be prevented without particular limitation. For example, as shown in FIG. 2, the eye model 10 may include an opening and closing unit 11a which is formed at the portion of the vitreous body 19 near the sclera 13 and which opens and closes the hole 11 by an elastic force to prevent the outflow of inner filling materials to the outside. The unit 11a may consist of elastic materials. The unit 11a may have cone-like shape of which a vertex is directed toward the vitreous body 19 and perforated to form an opening for receiving the catheter 20. The perforated vertex may be closed by the elastic force before insertion of the catheter 20 and opened when the catheter 20 is inserted.

The pressure sensor 21 is formed at one end of the catheter 20, and measures the pressure of the catheter 20 inserted into the hole 11 of the eye model 10. Here, the pressure of the inserted catheter 20 represents a pressure applied to the eye model 10 by a user through the catheter 20.

Further, the pressure sensor 21 may measure the pressure applied to the eye model 10 by the catheter 20 by measuring a pressure applied to an end of the catheter 20 upon training for surgery.

According to the embodiment of the present invention, the catheter 20 may further include an intraocular pressure sensor 22 which measures a fluid pressure inside the eye model 10.

The intraocular pressure sensor 22 may be provided at the outer surface of one side of the catheter 20, and this intraocular pressure sensor 22 senses the fluid pressure inside the eye model 10, allowing the intraocular pressure of the eye model 10 to be inferred therefrom.

For example, the change of the intraocular pressure in the real eye may be inferred by converting a value of the fluid pressure inside the eye model 10 measured by the intraocular pressure sensor 22 to a set value.

If necessary, this intraocular pressure sensor 22 may be mounted on the retina 15 which is an inner wall of the eye model 10 and measure the fluid pressure.

Further, according to the embodiment of the present invention, the eye model 10 and the catheter 20 may further include position sensors 12 and 23 which are installed inside the eye model 10 and at the catheter 20, respectively, which sense the position of the catheter 20.

The position sensors 12 and 23 may be respectively mounted at the inner wall of the eye model 10, and inside or outside of the catheter 20, and thus may sense the position information of the catheter 20 inserted inside the eye model 10 through mutual sensing between the position sensors 12 and 23.

For example, when at least one position sensor 12 is provided on the retina 15 which is the inner wall of the eye model 10, and at least one position sensor 23 is provided outside the catheter 20, the position sensors 12 and 23 may sense the position information of the catheter 20 inserted inside the eye model 10.

According to the embodiment of the present invention, the pressure sensor 21, the intraocular pressure sensor 22, and the position sensors 12 and 23 may each include a transmission means to transmit the measured value of information, may further include a display unit for receiving and displaying the value of information transmitted from these transmission means, and the display unit for displaying the value of information allows the users to identify the insertion pressure, the fluid pressure, the position information or the like of the catheter 20.

For example, the display unit may display the pressure of the catheter 20 inserted into the eye model 10, the change of the intraocular pressure according to the insertion of the catheter 20, the position information of the catheter 20, etc.

In another embodiment, when the pressure measured by the pressure sensor 21, the fluid pressure measured by the intraocular pressure sensor 22, the position information measured by the position sensors 12 and 23, or the like are out of range of the values set in advance, the users may be notified through an indicating means such as a sound or LED, and thus the users may be aware of a suitable pressure, position, or the like according to the insertion of the catheter.

Figure 4:
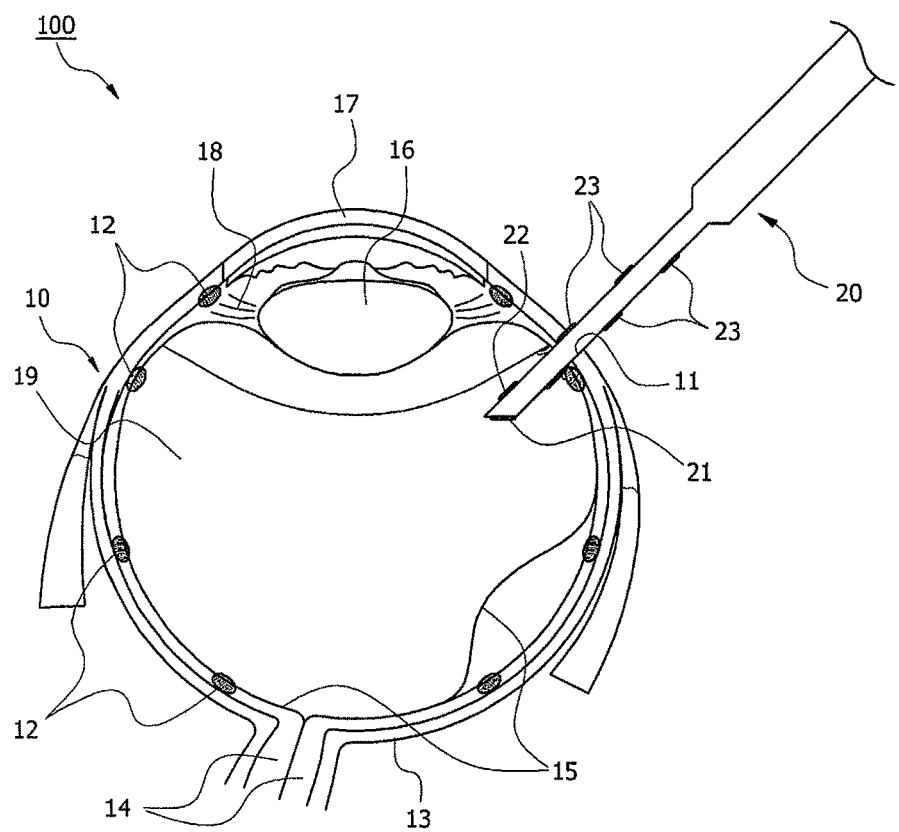
FIG. 4 is a state diagram for use of an ocular surgery training device according to another embodiment of the present invention.

Further, according to the embodiment of the present invention, the eye model 10 may have one or more selected from an opaque crystalline lens and a detached retina. The opaque crystalline lens may be configured by mixing particles of solid proteins into a phacocyst formed of a thin-film polymer material such as cellophane or the like. An eye model 10 having a structure in which the retina 15 is detached from a part of the optic nerve 14 may be used as the detached retina, as shown in FIG. 4.

The eye model 10 including the opaque crystalline lens or detached retina may allow the users to perform a simulated operation, and accordingly, the users may enhance their surgical skill.

DESCRIPTIONS FOR REFERENCE NUMBER

10: eye model
11: hole
11a: opening and closing unit
12: position sensor
13: sclera
14: optic nerve
15: retina
16: crystalline lens
17: cornea
18: ciliary body
19: vitreous body
20: catheter
21: pressure sensor
22: intraocular pressure sensor
23: position sensor
100: ocular surgery training device

The invention claimed is:
1. An ocular surgery training device comprises:
an eye model having a sclera, an optic nerve, a retina, a crystalline lens, a cornea, an iris, a ciliary body, a vitreous body consisting of a gel form in which polymer chains are chemically crosslinked or physically crossed to form a network, a hole formed on the sclera, an opening and closing unit which is formed at the portion of the vitreous body near the sclera and which opens and closes the hole by an elastic force to prevent the outflow of inner filling materials to the outside, an intraocular pressure sensor which is mounted on the retina and measures a fluid pressure inside the eye model, and position sensors which are installed on the retina; and a catheter inserted into the hole, wherein the catheter has a pressure sensor which is provided at one end of the catheter and measures a pressure applied to the eye model by a user through the catheter, an intraocular pressure sensor which is provided at one side of the catheter and measures the fluid pressure inside the eye model, and position sensors which are provided at the catheter and sense a position of the catheter, wherein the pressure sensor, the intraocular pressure sensor, and the position sensors each include a transmission means to transmit the measured value of information, a display unit for receiving and displaying the value of information transmitted from these transmission means, and an indicating means to notify the user through a sound or a light emitting diode when the measured value of information is out of range of the values set in advance, wherein the eye model includes one or more features selected from an opaque crystalline lens and a detached retina.

\* \* \* \* \*